United States Patent Office 3,767,595
Patented Oct. 23, 1973

3,767,595
PROCESS FOR PRODUCING COPPER
CHROMITE CATALYSTS
Stewart Robert Montgomery, Ashton, Md., assignor to
W. R. Grace & Co., New York, N.Y.
No Drawing. Filed Oct. 28, 1971, Ser. No. 193,577
Int. Cl. B01j 11/06, 11/40
U.S. Cl. 252—454                                         9 Claims

ABSTRACT OF THE DISCLOSURE

Copper chromite of a catalyst grade is produced from dissolved cuprammonium carbonate and/or bichromate intermediate which is formed by the reaction of copper and ammonium carbonate in the presence of an oxygen containing gas. Cuprammonium bicarbonate is reacted with chromic acid or copper bicarbonate to form basic ammonium cupric chromate which on calcination at 250° C. to 450° C. for from .1 to 20 hours yields copper chromite. The principal useful feature of this process is that it is non-polluting in that effluent process liquors and gases can be recycled.

---

This invention relates to cuprammonium bicarbonate and subsequently methods of forming copper chromite catalysts.

Copper chromite, which is usually designated $$XCuO \cdot Cr_2O_3$$

where X is a value of from .5 to 2.5, has been widely used as a catalyst for hydrogenating ketones, carboxylic esters, nitro compounds and the like. The processes of this invention are directed to methods for producing catalyst grade copper chromite by techniques which minimize the threat of any pollution of plant process waters. Prior to this time, copper and chrome laden waters could be allowed to enter adjacent waterways or a municipal sewage system, but with more stringent plant controls, this is not allowable. As a consequence, such metal laden streams have to be purified prior to any disposal.

This problem of plant effluent stream purification can be approached from essentially two different directions. One method is to install aqueous stream purification devices such as ion exchange devices, or to provide reaction vessels and to reactively precipitate the metal values. These, however, are expensive solutions to the problem, although effective. The approach of this invention was to devise new clean methods of synthesis for copper chromite catalysts. The aim was to produce catalysts in such a way that little or no pollutants were produced. By such techniques, essentially the same synthesis plant equipment could be used with no requirement to add on expensive plant effluent stream treatment devices. A further and distinct advantage is that by the elimination of side products and the essentially full conversion of the original quantities of copper and chrome values to catalytic copper chromite, the cost per pound of producing this catalyst is decreased. In summary, the ultimate result of this invention is a series of non-polluting methods for producing copper chromite, with each method producing higher yields of catalyst than prior art processes.

In brief summary, the processes of this invention comprise first the synthesis of cuprammonium bicarbonate by reaction of copper metal and aqueous ammonium carbonate. This reaction requires the bubbling of an oxygen containing gas through the mixture. Subsequently, the cuprammonium bicarbonate solution is used to prepare basic ammonium cupric chromate. The basic ammonium cupric chromate is then converted to active copper chromite catalyst by calcining at temperatures between 250° C. and 450° C. for periods ranging from .1 hour to 20 hours. This copper chromite catalyst can then be pelleted, extruded or otherwise shaped to the desired catalyst integrity required for plant operation.

In more detail, the principal step of this process is the efficient production of cuprammonium bicarbonate. This may operably be a mixture of cuprammonium bicarbonate and cuprammonium carbonate. For simplicity this material will be designated cuprammonium bicarbonate, since this is the principal product. The principal reaction is exemplified by the following equation:

(1) $Cu + 2(NH_4)_2CO_3 + \tfrac{1}{2}O_2 \rightarrow Cu(NH_3)_4(HCO_3)_2 + H_2O$ This is essentially the reaction of copper metal with an aqueous ammonium carbonate solution. This reaction is conducted at room temperature or slightly above, with the bubbling of an oxygen containing gas through the mixture. The bubbling of an oxygen containing gas oxidizes the copper to the cupric ion state. The oxygen containing gas may advantageously be an air stream. The product cuprammonium bicarbonate is then the starting material for any one of two differing reaction routes to produce copper chromite.

In a first reaction route, the cuprammonium bicarbonate of Equation 1 is reacted with aqueous chromite acid with excess ammonia being boiled off. This ammonia is recovered as ammonium carbonate and ammonium bicarbonate. The solid product is basic ammonium cupric chromate. Process liquors containing metal values are reused. This reaction is exemplified by the following equation:

(2) $CrO_3 + Cu(NH_3)_4(HCO_3)_2 + 2H_2O \rightarrow$
$CuNH_4OHCrO_4 + (NH_4)_2CO_3 + NH_4HCO_3$ The basic ammonium cupric chromate is then heated at 250° C. to 450° C. for from .1 to 20 hours to produce copper chromite with the only byproducts being nitrogen, water and traces of ammonia. This reaction is exemplified by the equation:

(3) $2CuNH_4OHCrO_4 \xrightarrow{heat} 2CuO \cdot Cr_2O_3 + N_2\uparrow + 5H_2O$ The trace amount of ammonia byproduct is removed from the stack gas, converted to ammonium carbonate and used for the production of cuprammonium bicarbonate. This is, therefore, a very efficient and clean means of producing catalyst grade copper chromite.

In a second reaction route, a first portion of an aqueous cuprammonium bicarbonate solution is heated to 30° C. to 100° C., along with aeration, to remove ammonia and form basic cupric carbonate as illustrated by the following equation:

(4) $2Cu(NH_3)_4(HCO_3)_2 + \xrightarrow{heat}$
$Cu(OH)_2 \cdot CuCO_3 + 8NH_3\uparrow + H_2O + 3CO_2\uparrow$ The basic cupric carbonate is then reacted with chromic acid to form copper dichromate. Copper dichromate and a second portion of cuprammonium bicarbonate is then reacted to form basic ammonium cupric chromate. This reaction is exemplified by the following equation:

(5) $Cu(NH_3)_4(HCO_3)_2 + CuCr_2O_7 + 2H_2O \rightarrow$
$2CuNH_4OHCrO_4 + CO_2\uparrow + (NH_4)_2CO_3$ The basic ammonium cupric chromate is then converted to catalyst grade copper chromite by the reaction of Equation 3.

In this mode of synthesis, the basic cupric carbonate, also known as malachite, may be produced by a method other than that set out in Equation 4. This may, for instance, be synthesized by the reaction of cupric sulfate with soda ash. However, no matter how synthesized, the basic cupric carbonate is reacted with chromic acid to form cupric dichromate, which is then subsequently reacted according to Equation 5 with cuprammonium bicarbonate to form the basic ammonium cupric chromate. And in yet a further mode of practicing this reaction route for producing copper chromite, the cupric dichromate intermediate may be produced by dissolving either cupric oxide or cupric hydroxide in hot aqueous chromic acid. This would then be reacted as in Equation 5 with cupric ammonium bicarbonate to produce basic ammonium cupric chromate.

The copper chromite catalysts of this invention can also be made or supported on an oxidic substrate. The preferred oxidic substrates are those having internal pores whereby the organic material to be hydrogenated can have a substantial surface area contact with the catalyst. Preferred oxidic supports are silicas including silica gels, aluminas, magnesia, titanias and comixtures of these materials. Several differing methods can then be used to actually produce the supported catalyst. These include comixing copper chromite powder with powdered support, and pelleting, pilling, extruding, balling or otherwise shaping the comixture followed by drying and calcining or coating of a shaped support with a copper chromite slurry followed by drying and calcining, or a coating of the support with an ammonical solution of basic ammonium cupric chromate followed by drying and calcining. Any one of these techniques will produce a suitable supported copper chromite catalyst.

There are several significant advantages to these new reaction routes for producing catalyst grade copper chromite. One is that the processes are non-polluting since the only significant byproducts are nitrogen gas and water. The reaction liquors in each step can be reused. Any trace ammonia evolved can be recovered using conventional scrubbers, and reused to make ammonium carbonate. Another advantage is that copper chromite catalysts having a differing copper value content to chrome value content can also be produced. That is, in the reaction step exemplified by Equation 5, the ratio of cupric ammonium bicarbonate to cupric chromate may be varied so as to yield a basic ammonium cupric chromate having varying ratios of copper to chrome values. This ability to vary the metal value content is important, since copper chromite catalysts can be tailored for use in specific reactions. In other words, the ability of copper chromite to catalyze a reaction can be maximized. Still other advantages of this process will be apparent to those in the art of making or using copper chromite catalysts.

The following examples are set out to further amplify the present invention:

EXAMPLE 1

This example sets out the synthesis of cuprammonium bicarbonate.

31.7 g. of powdered copper was admixed with 100 g. of ammonium carbonate dissolved in 340 ml. of water. This mixture was maintained at 35–40° C., and a stream of air was introduced at the bottom of the mixture using a fritted glass delivery tube. All of the copper dissolved in about 40 minutes to give a deep blue colored solution. Analysis proved this to be a solution containing cuprammonium ions and carbonate ions.

EXAMPLE 2

The procedure of Example 1 was repeated except that copper turnings were used in place of powdered copper. A deep blue solution of cuprammonium ions and carbonate ions was produced in 80 minutes. This solution is an admixture of cuprammonium bicarbonate and cuprammonium carbonate.

EXAMPLE 3

A cuprammonium bicarbonate solution was produced as in Example 1. After formation of the deep blue cuprammonium bicarbonate solution, the passage of air was continued for 18 hours. The solution was maintained at 30–40° C. during this period. 54 grams of a basic cupric carbonate precipitated out of solution (assay, 60 percent copper). This basic cupric carbonate precipitate was dissolved in a mixture of 100 g. of chromic acid and 150 ml. of water. Carbon dioxide gas was evolved with the formation of solubilized cupric dichromate. This solution was added to 472 g. of a cuprammonium bicarbonate solution prepared as in Example 1, causing cupric ammonium carbonate to precipitate. The weight of the precipitate after drying at 110° C. was 186 g.

This dried basic cupric ammonium chromate was calcined at 350° C. for 15 minutes. A black copper chromite powder was recovered having a surface area of 77 m.²/g. This catalyst was effective in reducing propyl propionate to propyl alcohol.

EXAMPLE 4

This example illustrates the synthetic route where malachite is used as an initial reactant.

58 g. of commercial grade synthetic malachite containing 0.5 gram equivalent of copper was dissolved in a mixture of 100 g. chromic acid and 150 ml. of water to give a solution of cupric dichromate with the evolution of carbon dioxide gas. The resulting cupric dichromate solution was added to an ammonical cupric bicarbonate solution prepared by the method of Example 1 with the precipitation of basic cupric ammonium chromate. The weight of the solid recovered after filtration and drying at 110° C. was 193 g. This precipitate was calcined for 30 minutes at 350° C. A black copper chromite powder with a surface area of 72 m.²/g. was obtained. This catalyst was effective in reducing butyraldehyde to butyl alcohol.

EXAMPLE 5

This example illustrates the advantage in these processes of recycling process solutions. This feature decreases the amount of these solutions which must be disposed of.

The filtrate remaining from the precipitation of the basic cupric ammonium chromate in Example 4 is used to dissolve additional amounts of powdered copper to form cuprammonium carbonate. Hence, 50 g. of ammonium carbonate and 31.7 g. of copper powder were added to the filtrate and a rapid stream of air passed through the mixture at 30–40° C. After 40 minutes, all of the copper dissolved to give the deep-blue colored cuprammonium bicarbonate solution. The solution of cupric dichromate prepared from 58 grams of malachite and 100 g. of chromic acid was added to the above solution, and basic cupric ammonium chromate precipitated. This precipitate was recovered by filtration and drying at 110° C. weighed 214 g.

A portion of the above product was calcined in a laboratory muffle for 15 minutes at 350° C. A black powder with a surface area of 67 m.²/g. was obtained. This catalyst was effective in reducing diethyl adipate to hexamethylene glycol.

EXAMPLE 6

This example illustrates the formation of copper chromite from chromic acid and cuprammonium bicarbonate.

50 g. of chromic acid was dissolved in 50 ml. of water. This solution was added to an ammonical cupric bicarbonate solution prepared according to Example 1. A green colored solid precipitated. This mixture was heated to the boiling point and about half of the water was removed by evaporation. The color of the precipitate changed from green to brown as excess ammonia boiled off. The basic cupric ammonium chromate isolated after filtration and drying at 110° C. weighed 91 g. This material was converted to an active copper chromite catalyst by calcination at 350° C. for 20 minutes.

What is claimed is:

1. A method for forming a copper chromite catalyst comprising:
   reactively dissolving copper metal in an aqueous ammonium carbonate solution by passing an oxygen containing gas through said ammonium carbonate solution to form a solution containing cuprammonium and carbonate ions;

adding an aqueous reactant solution selected from the group consisting of a chromic acid solution and a cupric dichromate solution to said solution of cuprammonium and carbonate ions to form basic cupric ammonium chromate and an ammonium carbonate solution;

recycling said ammonium carbonate solution to the step of reactively dissolving copper metal; and calcining said basic cupric ammonium chromate at about 250° C. to 450° C. for from .1 to 20 hours and recovering a copper chromite catalyst.

2. A method as in claim 1 wherein said oxygen containing gas is air.

3. A method as in claim 1 wherein said oxygen containing gas is oxygen.

4. A method as in claim 1 wherein during the passage of said oxygen containing gas through said ammonium carbonate solution, the temperature of said solution is maintained at from about 20° C. to 50° C.

5. A method as in claim 1 wherein said cupric dichromate is formed by heating cuprammonium carbonate to remove ammonia and form basic cupric carbonate, and reactively admixing said basic cupric carbonate with chromic acid to form said cupric dichromate.

6. A method as in claim 1 wherein said basic cupric ammonium chromate is calcined at 300° C. to 400° C. for from 10 minutes to 3 hours.

7. A method as in claim 1 wherein acid copper chromite is supported on an inert carrier.

8. A method as in claim 7 wherein said inert carrier is selected from the group consisting of silica, alumina, silica-alumina, titania, diatomaceous earth and mixtures thereof.

9. A method as in claim 1 wherein the ratio of copper values to chromium values in said copper chromite is about 1:1.

References Cited
UNITED STATES PATENTS

| | | | |
|---|---|---|---|
| 3,698,859 | 10/1972 | Velten | 252—467 X |
| 2,129,507 | 9/1938 | Salzberg | 252—458 X |
| 2,137,407 | 11/1938 | Lazier | 252—458 X |

CARL F. DEES, Primary Examiner

U.S. Cl. X.R.

252—455 R, 458, 467, 469, 476; 423—595